United States Patent [19]

Steckler

[11] 4,058,491
[45] Nov. 15, 1977

[54] CATIONIC HYDROGELS BASED ON HETEROCYCLIC N-VINYL MONOMERS

[75] Inventor: Robert Steckler, San Diego, Calif.

[73] Assignee: Plastomedical Sciences, Inc., Briarcliff Manor, N.Y.

[21] Appl. No.: 549,097

[22] Filed: Feb. 11, 1975

[51] Int. Cl.$^2$ .................. C08F 220/20; C08F 26/00
[52] U.S. Cl. ................... 260/2.2 R; 204/159.22; 260/79.3 MU; 424/248.4; 424/256; 424/269; 424/274; 526/213; 526/218; 526/227; 526/230; 526/260; 526/263; 526/264
[58] Field of Search ................ 260/80.72, 2.2 R; 526/258, 263, 260, 264

[56] References Cited

U.S. PATENT DOCUMENTS

| | | | |
|---|---|---|---|
| 3,178,397 | 4/1965 | Olaj et al. | 260/80.72 |
| 3,532,679 | 10/1970 | Steckler | 260/80.72 |
| 3,721,657 | 3/1973 | Seiderman | 260/80.72 |
| 3,803,104 | 4/1974 | Barabas et al. | 260/80.72 |

Primary Examiner—Harry Wong, Jr.
Attorney, Agent, or Firm—George L. Tone

[57] ABSTRACT

Novel cationic hydrogels, containing basic (cationic) groups in their molecular structure, and processes for their preparation are described. These novel hydrogels are stable, three-dimensional polymer networks, having good water permeability and mechanical properties. They are obtained by simultaneous polymerization and cross-linking in the presence of a polymerization catalyst, such as an organic peroxide, azobisisobutyronitrile or other free radical polymerization catalyst, of a mixture of (a) a heterocyclic monomer preferably an N-vinyl lactam, (b) a cationic monomer — usually an ester of acrylic or methacrylic acid with an amino alcohol, the terminal amino group of which may be quaternized, such as dimethylaminoethyl methacrylate or acrylate and the quaternized derivatives thereof, and (c) a cross-linking agent, such as a glycol or polyglycol diacrylate or dimethacrylate and also, preferably, (d) at least one acrylic monomer capable of polymerizing to a very high molecular weight, such as hydroxyethyl- or hydroxypropyl-acrylate or methacrylate, or a lower alkyl acrylate or methacrylate; if desired there may also be present in the monomer mixture (e) other polymerizable ethylenically unsaturated monomers, which are copolymerizable with components (a), (b), (c) and (d). The thus obtained cationic hydrogels are useful for combining by reaction or complexing, with water soluble or dispersible materials having an opposite charge; such as acidic or anionic agricultural chemicals (insecticides, herbicides, fungicides, plant growth regulators, etc.), germicides, pharmaceuticals, cosmetics, hormones, enzymes, flavors, fragrances, antiperspirants, metals and the like, both to recover such acidic or anionic materials from an aqueous medium and for purifying water containing them, and also for the preparation of a complex or other combination of the cationic hydrogel with such anionic materials which may be useful per se or from which the complexed or combined acidic or anionic material may be slowly or controllably released.

15 Claims, No Drawings

CATIONIC HYDROGELS BASED ON HETEROCYCLIC N-VINYL MONOMERS

The present invention relates to new and useful cationic hydrogels which are stable three dimensional copolymer networks, having good water permeability and mechanical properties, and are obtained by simultaneous copolymerization and cross-linking, in the presence of a polymerization catalyst, of a mixture of (a) a heterocyclic N-vinyl monomer, preferably an N-vinyl lactam, (b) a polymerizable, cationic, ethylenically unsaturated monomer containing one or more cationic groups in its molecular structure, such as an ester of an amino alcohol with acrylic or methacrylic acid or the quaternized derivatives of such esters, and (c) a cross-linking agent, such as a glycol diacrylate or dimethacrylate or divinyl benzene, etc.; and also, preferably, (d) at least one acrylic monomer capable of polymerizing to a very high molecule weight; there may also be present (e) other polymerizable ethylenically unsaturated monomers, which are copolymerizable with components (a), (b), (c) and (d).

BACKGROUND OF THE INVENTION

In my U.S. Pat. No. 3,532,679, issued Oct. 6, 1970, and entitled Hydrogels from Cross-linked Polymers of N-Vinyl Lactams and Alkyl Acrylates, I have described certain neutral hydrogels obtained by simultaneous polymerization and cross-linking of a mixture of an N-vinyl lactam, and alkyl acrylates. In my copending application Ser. No. 383,275 filed July 27, 1973, now U.S. Pat. No. 3,878,175 issued Apr. 15, 1975 I have described an improvement on my said patent, wherein a solution of the monomers in a hydrophobic solvent is simultaneously polymerized and cross-linked; whereby a highly absorbent, spongy, polymeric, neutral hydrogel is obtained.

I have now found that such N-vinyl lactam or other heterocyclic N-vinyl monomer based hydrogels can be modified, by incorporating cationic monomer in the mixture of monomers being simultaneously polymerized and cross-linked, so that a hydrogel having cationic functionality, and thus new and useful properties, is obtained.

A number of cationic polymeric materials, containing amino or quaternary ammonium groups which impart cationic functionality thereto, which are homopolymers or copolymers, with other ethylenically unsaturated monomers, are known in the art. One well known type of cationic polymers are the anion exchange resins available under such trade-names as Amberlite, Dowes, Permutit and Zeocarb. Other cationic polymers have found such varied applications in the arts as flocculants, as films and fibers (including use as additives to non-ionic synthetic polymeric films and fibers) having improved dye receptivity, especially for acid dyes, as antistatic agents and a variety of other uses. Such known cationic polymers have however largely, if not always, been rather rigid solids and have not been hydrogels.

On the other hand practically all of the known hydrogels are neutral hydrogels and are not ionic in character. While in U.S. Pat. No. 3,689,634, issued Sept. 5, 1972 to Kliment, Vacik, Majkus and Wichterle, entitled Protracted Activity Oral Hydrogel Bead; there is a broad suggestion that "it is also possible to replace the non-ionizable cross-linked hydrogels by physically similar hydrogels containing also ionizable groups"; the only examples of ionic hydrogels disclosed in this patent are: "A porous hydrogel capable of exchanging cations prepared by copolymerizing a mixture of 35 parts of methacrylic acid, and 30 parts of a 25 percent aqueous solution of maleic anhydride," disclosed in Example 8 at the top of column 8 of the patent; and "A" copolymer prepared from 97 parts of ethylene glycol monomethacrylate, 2 parts of methacrylic acid and 1 percent of ethylene glycol bis-methacrylate by suspension polymerization in a concentrated, aqueous solution of sodium chloride, using 0.05 parts of diisopropyl percarbonate as a polymerization initiator," disclosed in Example 9 at the middle of column 8 of the patent. These prior art ionic hydrogels are obviously substantially different from those of the present invention; inter alia, they are anionic in character and thus have the opposite charge of those of the present invention; in addition they contain no N-vinyl lactam, or other N-vinyl hetrocyclic monomer units and thus are structurally different from those of the present invention, and would be lacking in properties attributable to such N-vinyl lactam etc. units.

One of the outstanding advantages of the hydrogels of the present invention which contain cationic groups, as compared with the non-hydrogel form of cationic polymeric materials heretofore obtained by the use of cationic copolymerizable monomers, such as those mentioned above which contain amino or quaternary ammonium groups, is that the hydrogel form of the cationic polymers of the present invention permits and assures much more intimate contact between the cationic groups of the cationic polymeric hydrogel and any acidic material which it is desired to combine or complex therewith. In the presence of water the cationic hydrogels of the present invention are quite porous and swollen. Due to this swelling the water, and any acidic material dissolved or dispersed therein, of an aqueous medium with which these cationic hydrogels are used, or come in contact with during use, can readily diffuse or be transported throughout the hydrogel. As a result, combination or complexing of acidic materials with the cationic groups of the polymeric hydrogel can and does take place throughout the hydrogel in contrast for example, with the essentially surface action in the case of anion exchange resins. This swelling also increases the distance between the cationic groups of the hydrogel and this is also conducive to more complete reaction. Thus acidic materials can be combined or complexed much more efficiently and completely with the cationic groups of the cationic polymeric hydrogels of the present invention; and, conversely, acidic materials which are complexed or otherwise combined with the cationic groups of the cationic polymeric hydrogels of this invention may be more efficiently released therefrom and transferred to an aqueous medium with which they are used, especially in comparison with the corresponding cationic ion exchange resins.

OBJECTS OF THE INVENTION

It is, therefore, an object of the present invention to provide a new class cationic polymeric materials, containing basic groups, in the form of hydrogels having new and useful properties.

It is a further object of this invention to provide methods of making this new class of cationic hydrogels.

It is a further object of this invention to provide new and useful compositions and processes containing and- /or utilizing the novel cationic hydrogels of this invention.

Other and further objects will be apparent as the present description progresses.

DETAILED DESCRIPTION OF THE INVENTION

As previously stated, the novel anionic hydrogels of this invention are obtained by simultaneous catalytic polymerization and cross-linking of a mixture of:

a. a heterocyclic N-vinyl monomer;
b. a cationic ethylenically unsaturated monomer, which is copolymerizable with component (a) and which contains a cationic group in its molecular structure; and
c. a cross-linking agent;

I also prefer to include in the monomer mixture:

d. at least one acrylic monomer capable of polymerizing to a very high molecular weight;

there may also be present in the monomer mixture:

e. other polymerizable mono-ethylenically unsaturated monomers, which are copolymerizable with components (a), (b), (c) and (d).

Component (a)

The heterocyclic N-vinyl monomer, used as component (a) above, may be N-vinyl imidazole, having the formula:

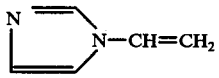

Formula 1.

but I prefer to employ a heterocyclic N-vinyl monomer containing a carbonyl function adjacent to the nitrogen in its heterocyclic and represented by the formula:

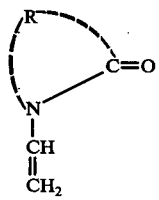

Formula 2.

wherein R represents a divalent aliphatic group, preferably alkylene, containing a linear chain of 3 to 5 atoms necessary to make up the 5 to 7 membered heterocyclic ring.

I particularly prefer N-vinyl-2-pyrrolidone or other N-vinyl lactams such as N-vinyl-2-piperidone or N-vinyl-εcaprolactam. These N-vinyl lactams may be substituted in the lactam ring by one or more lower alkyl groups such as methyl, ethyl or propyl. As examples of other heterocyclic N-vinyl-monomers, which may be used as component (a), either alone or in admixture with each other or in admixture with one or more N-vinyl lactams, may be mentioned: N-vinyl succinimide, N-vinyl diglycoylimide, N-vinyl glutarimide, N-vinyl-3-morpholinone, N-vinyl-5-Methyl-3-morpholinone, N-vinyl imidazole, etc.

Component (b)

The cationic monomer, which may be used as component (b) above, may be any ethylenically unsaturated monomer containing an amino or quaternary ammonium group, which is copolymerizable with component (a), and which is represented by the formula:

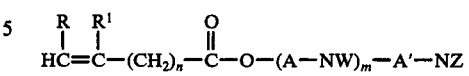

Formula 3.

wherein
R represents hydrogen, methyl or aryl, i.e. phenyl or naphthyl;
$R^1$ represents hydrogen, or alkyl of 1 to about 18 carbon atoms, preferably of from 1 to about 6 carbon atoms;
A and A', each of which may be the same or different, each represents an alkylene group of from about 2 to 8 carbons or an arylene group;
NW and NZ represent amino groups of the formula

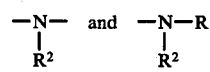

respectively or quaternized group of the formula

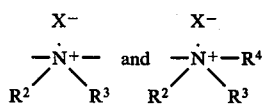

respectively; (as defined following Formula 5 below).
$n$ represents an integer, including 0, of from 0 to about 10; and
$m$ represents an integer, including 0, of from 0 to about 5.

As the cationic monomer, used as component (b) above, I particularly prefer the esters of acrylic and methacrylic acid, crotonic acid, vinyl acetic acid, allyl acetic acid, undecylenic acid, etc. with amino alcohols. Such esters can be represented by the formula:

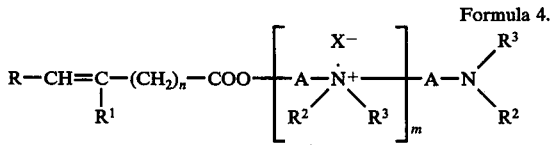

Formula 4.

and the quaternized derivatives thereof (in which the terminal tertiary amino group has been quaternized to a quaternary ammonium group) of the formula:

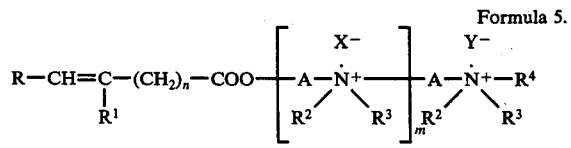

Formula 5.

wherein:
A, each of which may be the same or different, represents an alkylene group of from 1 to about 20 carbon atoms but including oxygen interrupted alkylene groups (i.e.; polyglycol ether group of the formula

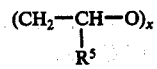

wherein $R^5$ represents H, methyl or ethyl and $x$ represents an integer of from 1 to about 20);

R represents H or methyl;

$R^1$ represents H or, when R is H, an alkyl group of 1 to 4 carbon atoms, preferably H or methyl;

$R^2$, $R^3$ and $R^4$, each of which may be the same or different, each represents alkyl of from 1 to about 20 carbon atoms, aryl (preferably phenyl), alkaryl (preferably benzyl) or the $R^2$ and $R^3$, on the same nitrogen atom, taken together may represent a divalent aliphatic group of 4 to 5 atoms which jointly with the amino nitrogen forms a five or six membered heterocyclic amino group such as pyrrolidinyl, piperidinyl, morpholino or thiamorpholino and these groups may have a lower alkyl substituent such as a methyl or ethyl group;

X and Y, each of which may be the same or different, each represents an anion (forming the anionic portion of a quaternary ammonium group) such as a halogen ion (fluorine, chlorine, bromine or iodine), a sulfate ion, a hydroxyl ion or a nitrate ion, X is preferably chlorine or bromine and Y is preferably chlorine, bromine or lower alkyl sulfate (i.e.; methyl or ethyl sulfate), and in case there are two or more Xs in the molecule each of them may be the same or different;

$n$ represents an integer, including 0, of from 0 to about 10; and $m$ represents an integer, including 0, of from 0 to about 5.

As examples of preferred cationic monomers may be mentioned: dimethylaminoethyl acrylate and methacrylate, diethylaminoethyl acrylate and methacrylate, diisopropylaminoethyl acrylate and methacrylate, dibutylaminoethyl acrylate and methacrylate, dimethylaminobutyl acrylate and methacrylate, diethylaminohexyl acrylate and methacrylate, t-butylaminoethyl methacrylate; t-butylaminoethyl methacrylate, isobutylamino-butyl acrylate, isobutylaminopropyl methacrylate, isobutylamino-ethyl methacrylate, octylamino-ethyl methacrylate, docecylamino-ethyl methacrylate, isohexylaminoethyl methacrylate, (N-propyl-N-methyl) amino-ethyl methacrylate, t-butylamino-ethyl vinyl acetate, t-butylamino-ethyl crotonate, t-butylamino-ethyl isocrotonate, N,N-dimethylamino-ethyl crotonate, N,N-diethylamino-ethyl isocrotonate, etc. and particularly the quaternization products of these and analogous products with such quaternizing agents as dimethylsulfate, methyl chloride and the like. Also such products as 3-methacryloxy-2-hydroxypropyl trimethylammonium chloride, the corresponding 3-acryloxy- compounds and like products disclosed in Rohm and Haas British Pat. No. 1,112,912, published May 8, 1968; Sobolev U.S. Pat. No. 3,329,706, issued July 4, 1967 and U.S. Pat. No. 3,397,227, issued Aug. 13, 1968, the disclosures of which are incorporated herein by reference. Also the esters of acrylic acid and methacrylic acid with amino alcohols which contain two or more quaternary ammonium groups, or 1 or more quaternary ammonium groups and a terminal tertiary amino group, such as the quaternization product of dimethylaminoethyl acrylate or methacrylate with diethylaminoethyl chloride hydrochloride and the quaternization products thereof with methylene chloride or dimethylsulfate; the quaternization product of dimethylaminoethyl acrylate or methacrylate with chlorocholine chloride and other related products of this type disclosed in the copending application of myself and S. Linder, Ser. No. 471,441 filed May 20, 1974, now U.S. Pat. No. 4,009,201, the disclosure of which is incorporated herein by reference. Other esters of acrylic and methacrylic acid the ester groups of which contain amino or quaternary ammonium groups are disclosed in Hayck U.S. Pat. No. 2,723,256, issued Nov. 8, 1955. As examples of other basic or cationic monomers, which may be used as component (b), may be mentioned the allyl quaternary ammonium salts disclosed in Langher et al. U.S. Pat. No. 3,532,751, issued Oct. 6, 1970. The disclosures of which are incorporated herein by reference.

Component (c)

As the cross-linking agent, component (c), I particularly prefer the alkylene glycol diacrylates or dimethacrylates and the polyalkylene glycol diacrylates and dimethacrylates, represented by the formula:

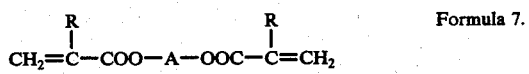

Formula 7.

wherein,

R represents hydrogen or alkyl of 1 to 4 carbon atoms, and

A represents alkylene of from 2 to about 10 carbons or a polyglycol ether group of the formula

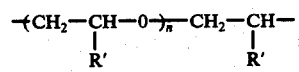

in which $R' = H$, $-CH_3$ or $-C_2H_5$ and $n = 1$–20.

as examples thereof may be mentioned: ethylene glycol diacrylate, ethylene glycol dimethacrylate, propylene glycol diacrylate, propylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, pentaethylene glycol diacrylate, pentaethylene glycol dimethacrylate, hexamethylene glycol diacrylate, hexamethylene glycol dimethacrylate, and mixtures of the foregoing. There may also be used such cross-linking agents as divinylbenzene, divinyl ether, divinyl toluene, diallyl tartrate, diallyl maleate, divinyl tartrate, N,N'-methylene- bis-acrylamide, and the like.

While I have obtained valuable cationic hydrogels by the use of a mixture of only monomer components (a), (b) and (c); I have found that the cationic hydrogels so produced may contain an appreciable amount of relatively low molecular weight polymers (i.e. polymers of a molecular weight of from 10,000 to 50,000) and may be somewhat less physically strong than desired, possibly due to the water solubility of their low molecular weight polymer content. While cationic hydrogels containing such relatively low molecular weight polymers may be preferred for certain applications, I have found that for most applications polymeric materials which are relatively free of such low molecular weight polymers are to be preferred. In order to assure the production of cationic hydrogels having the most desirable properties for most applications, I preferably include in the mixture of monomers, which is simultaneously polymerized and cross-linked, as component (d) of such mixture, an appreciable amount of at least one acrylic monomer capable of polymerizing to a very high molecular weight (100,000 or higher). The presence of such a component (d) serves to substantially increase the average molecular weight of the resulting cationic polymeric hydrogel and to minimize or eliminate the amount of relatively low molecular weight cationic polymers present therein.

Component (d)

Component (d) — an acrylic monomer capable of polymerizing to a very high molecular weight — is any acrylic monomer which may be represented by the following general formula:

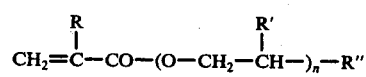

Formula 9:

wherein:
R and R' each represents hydrogen, or lower alkyl of 1 to about 4 carbon atoms; and
R" represents hydroxyl, alkoxy or hydroxyalkoxy or, when n is 0 (zero), R" may also represent —NH₂ or

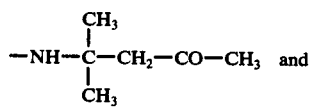

n represents an integer (including 0) of from 0 to about 20.

As component (d), I particularly prefer acrylamides such as acrylamide, N-(1,1-dimethyl-3-oxobutyl) acrylamide also called diacetone acrylamide (described in U.S. Pat. No. 3,497,467, issued Feb. 24, 1970 to Coleman) and methacrylamide; hydroxyalkyl acrylates and methacrylates such as glyceryl monoacrylate and glyceryl monomethacrylate; and glycol monoacrylates and glycol monomethacrylates or monohydroxy (and monoalkoxy) polyalkylene glycol acrylates and methacrylates. Such hydroxy alkyl acrylates and methacrylates may be considered as the alkylene oxide adducts of acrylic or methacrylic acid with alkylene oxides, as they are generally produced by the reaction of one molar proportion of acrylic or methacrylic acid with one or several molar proportions of a lower alkylene oxide, such as ethylene oxide, propylene oxide or 1,2-butylene oxide. As examples of specific hydroxy alkyl acrylates and methacrylates and of monohydroxy (and monoalkoxy) polyalkylene glycol monoacrylates and monomethacrylates of Formula 9, which may be used as component (d), may be mentioned: hydroxyethyl acrylate, hydroxyethyl methacrylate, diethylene glycol monoacrylate, diethylene glycol monomethacrylate, triethylene glycol monoacrylate, triethylene glycol monomethacrylate, methoxyethylene glycol acrylate or methacrylate, methoxy polyethylene glycol acrylate or methacrylate, ethoxy ethylene glycol acrylate or methacrylate, ethoxy polyethylene glycol acrylate or methacrylate, butoxy ethylene glycol acrylate or methacrylate, 2-hydroxy propyl acrylate or methacrylate, 2-hydroxy butyl acrylate or methacrylate, polypropylene glycol acrylate or methacrylate, polybutyleneglycol acrylate and methacrylate and analogous hydroxyalkyl acrylates or methacrylates and monohydroxy (and monoalkoxy) polyalkylene glycol acrylates and methacrylates.

Such acrylic monomers as acrylonitrile, methacrylonitrile and alkyl acrylates and methacrylates are also quite effective for increasing the molecular weight of the polymeric hydrogels of the present invention and may be used as component (d) if desired. It is quite possible and entirely feasible to use a mixture of several acrylic monomers as component (d) and from a cost standpoint it is frequently advantageous to use a mixture of say acrylamide with one or more of, the somewhat more expensive, hydroxyalkyl acrylates or methacrylates. The alkyl acrylates and methacrylates, especially the lower alkyl acrylates and methacrylates, are also less expensive than the hydroxyalkyl acrylates and methacrylates; so that, where cost is a controlling or important factor, it is often advantageous to replace all or part of the preferred hydroxyalkyl acrylates or methacrylates listed above with an alkyl acrylate or methacrylate. As examples of specific alkyl acrylates and methacrylates, which may be used as component (d), either alone or in admixture with each other or in admixture with one or more of the preferred hydroxyalkyl acrylates or methacrylates, listed above, may be mentioned: methyl acrylate, methyl methacrylate, ethyl acrylate, ethyl methacrylate, butyl acrylate, butyl methacrylate, hexyl acrylate, hexyl methacrylate, lauryl acrylate, lauryl methacrylate, etc. The lower members of this series are preferred, because of greater reactivity and because larger percentages can be incorporated into the copolymer without substantially reducing the percent swelling and hydrophilic characteristics of the copolymers.

Component (e)

As previously mentioned, if desired there may also be used, as component (e), other monoethylenically unsaturated monomers which are copolymerizable with components (a), (b), (c) and (d) in the mixture of monomers subjected to simultaneous polymerization and cross-linking. As examples of specific monomers which may be used as component (e) may be mentioned: vinyl acetate, vinyl propionate, vinyl butyrate, vinyl chloride, vinylidene chloride, vinyl methyl ketone, styrene, methoxystyrene, monochlorostyrene, ar-methylstyrene, ar-ethylstyrene, α, ar-dimethylstyrene, ar, ar-dimethylstyrene, vinylnaphthalene, vinyl benzoate, ethyl vinyl ether, n-butyl vinyl ether, isobutyl vinyl ether and the like.

The fact that the cationic polymers of the present invention are hydrogels, as distinguished from a solid resinous structure, I attribute primarily to the amount of component (a) — the heterocyclic N-vinyl monomer component — used in their preparation or, when a component (d) is used and is a water-soluble acrylic monomer such as a hydroxyalkyl acrylate or methacrylate or a monohydroxy polyglycol monoacrylate or monomethacrylate, to the combined amount of component (a) and such component (d) used in their preparation; and only secondarily to the amount of cross-linking agent, component (c), which is used. Within the proportions, specified below, of monomer components, the amount of cross-linking agent appears to effect primarily the degree of water swellability of the hydrogel. With any given recipe the swellability (expressed as water content at equilibrium at 25° C., in percent by weight), of the hydrogel ultimately obtained, decreases as the amount of cross-linking agent employed therein is increased; and is thus inversely proportional to the amount of cross-linker used.

The cationic character of the ionic hydrogels of the present invention is attributable to the amount of component (b) — the monoethylenically unsaturated monomer containing a cationic group — used in their preparation; and the amount of anionic materials which may be combined or complexed with them is directly proportional to the amount of component (b) used. Thus the particular application contemplated for the cationic hydrogel and the amount of anionic material, with which it is desirable that they be able to combine, will primarily determine the amount of component (b) to be used.

Considerable variation is possible in the relative amount of each of the foregoing monomer components (a), (b), (c), (d) and (e) which is used and a cationic polymeric hydrogel is obtained when the mixture of such monomer components which is subjected to simultaneous polymerization and cross-linking is composed of:

| % by weight (based on total weight of all monomer components used) | Component |
| --- | --- |
| about 20% to about 95% | (a) the heterocyclic N-vinyl monomer. |
| about 50% to about 0.05% | (b) the monoethylenically unsaturated monomer which contains a cationic group in its molecular structure. |
| about 0.2% to about 12% | (c) the cross-linking agent. |
| 0% to about 50% | (d) the acrylic monomer capable of polymerizing to a very high molecular weight. |
| 0% to about 30% | (e) a polymerizable monoethylenically unsaturated monomer. |

It will be understood that while the primary function served by component (d), when it is used, is to increase the molecular weight of the cationic hydrogel which is ultimately obtained and to minimize or eliminate the presence of relatively low molecular polymers in the ultimate hydrogel; component (d) can also be considered as an extender or partial replacement of the heterocyclic N-vinyl monomer, component (a). When a component (d) is used, the total amount of component (d) which is used in any particular recipe should not exceed the amount of component (a) used in the same recipe. However the total amount of both component (a) and component (d) which is used should not exceed the maximum amount of component (a) (95% by weight of the total monomers) specified above. This can also be expressed "$(a) \geq (d)$ and $(a) + (d) =$ about 40% to about 95% by weight of the total weight of all monomers used".

POLYMERIZATION AND CROSS-LINKING

The simultaneous polymerization and cross-linking to make the hydrogels of the present invention may be carried out by various techniques known in the art. Thus the polymerization and cross-linking may be effected by bulk polymerization of a mixture of the several monomer components (a), (b), (c), and (d) and (e) if desired, in the proportions given above, in the presence of a free radical polymerization catalyst such as any of the well known inorganic or organic peroxides, azobisisobutyronitrile, etc. polymerization catalysts.

Such catalysts may be employed in the range of about 0.05 to about 4% of the total monomers. The preferred amount of catalyst is about 0.1 to about 2.0% of the monomer components. Typical catalysts include MEK peroxide (methyl ethyl ketone peroxide), lauroyl peroxide, t-butyl-peroctoate, benzoyl peroxide, isopropyl percarbonate, cumene hydroperoxide, dicumyl peroxide, azobisiso-butyronitrile, potassium persulfate, potassium peroxide, etc. Irradiation, as by ultraviolet light or gamma rays, also can be used to catalyze the polymerization and cross-linking.

The polymerization and cross-linking may be effected at temperatures in the range of 20° C. to 100° C. or somewhat higher, preferably in the range of 35° C. to about 60° C., until most of the polymerization is effected, followed by a post-cure at about 100° C. to about 125° C. for about an hour.

Advantageously, the polymerization and cross-linking may be effected by the use of a casting technique of the type described in my said U.S. Pat. No. 3,532,679 in which a mixture of the monomer components, catalyst and, if desired, a mold release agent is deaerated, as by the application of vacuum until air bubbles no longer rise to the surface, poured into a suitable mold, such as a polymerization tray or cell, which is then sealed and held at a suitable temperature, as by placing in a circulating air oven or heating bath, until a hard polymer is obtained. The hard polymer so obtained may be further cured by heating to a somewhat higher temperature, than that used for the polymerization, such as 100° C. to 125° C. for about an hour. The cell is then opened and the cured polymer removed therefrom. The mold may be in the shape of the desired product or the solid polymer may be fabricated, after curing, into the desired shape; e.g., it may be ground into a powder or cut into the desired shape. Such polymerization and cross-linking may also be carried out in the manner described in my said copending application Ser. No. 385,275, filed July 27, 1973, now U.S. Pat. No. 3,878,175 wherein a solution of the several monomer components in an inert, nonpolar hydrophobic liquid such as silicone liquid, hexane, octane, mineral oil, toluene, xylene, etc. is simultaneously polymerized and cross-linked; whereby the polymer can ultimately be obtained in a porous or spongy or foamy form.

It will also be understood that the simultaneous polymerization and cross-linking may be effected, employing solvent polymerization techniques, in the presence of water-soluble solvents in which the monomer components (a), (b), (c), (d) and (e) are soluble. Such solvents include the lower aliphatic alcohols such as methanol, ethanol, propanol and isopropanol; acetone, dioxane, ethylene glycol, glycol esters or ethers etc. By such procedures the polymer is obtained in the form of an organogel from which the organic solvent may be removed by washing with water or by distillation or evaporation.

The polymer so obtained by casting may then be immersed in water and thereby gradually swollen into a hydrogel. In the case of polymers produced in a casting technique involving the use of either a hydrophobic or water soluble solvent and which thus still contain the solvent, the solvent is displaced by the water during the immersion. Such displacement of the solvent by the water may be speeded up by kneading or squeezing the polymer during the swelling, as by passing it between squeeze rollers. The swelling in water is continued until equilibrium is reached, or until a hydrogel containing the desired amounts of water is reached. The cationic hydrogels so obtained are soft pliable materials which can be reacted with anionic materials.

It will be appreciated that polymeric products having a predetermined shape may be obtained by the use of molds of the desired shape. Thus, a product having a definite curved shape may be obtained by casting between a pair of curved glass sheets. Rods may be obtained by casting and curing in glass or plastic (e.g. nylon or polyethylene) tubes. Hollow tubes can be cast between two concentrically disposed glass tubes or by centrifugal casting procedures under polymerization conditions.

Further details of the present invention are illustrated in the specific examples which follow of preferred embodiments thereof. In these examples the polymeric cationic hydrogels were prepared employing a conventional type casting cell prepared by inserting a soft and flexible, 3/16 inch thick, vinyl gasket between two pieces of 8 inch × 12 inch × ¼ inch polished plate glass, the gasket being positioned about one inch from the edge of the glass sheets. The glass plates were then clamped with spring type clamps, such as one inch binder clips or spring loaded clamps. The size of the cell is not critical but will depend on the size of cast sheet desired and any size limitations of the oven or heating bath to be employed. For laboratory preparations I have found glass sizes of up to 16 inches × 16 inches to be convenient. The thickness of the gasket should be about 20-30% greater than the desired thickness of the final cast sheet and round, square or rectangular gaskets with sides or diameter of from about 0.8 inch to about 0.5 inch may be used to control sheet thickness. Rods may conveniently be cast in sealed glass, nylon, polyethylene, etc. tubing of approximately ½ inch diameter and 12 inches – 18 inches long.

The casting mixture consisting of monomers, catalyst, mold release agent or other additives if desired, was deaerated by application of vacuum until air bubbles no longer rose to the surface. The deaerated casting mixture is then poured into the casting cell which is then sealed and placed horizontally on a shelf in a circulating air oven equipped with constant temperature control. Unless otherwise specified it was kept in this oven at 50°-55° C. until substantially polymerized, usually in 18-48 hours. The temperature is then raised gradually (over 2-4 hours) to approximately 100° C., and polymerization completed during 1 to 3 hours at 100°-125° C. The mold was allowed to cool to room temperature, the clips removed, and the mold pried open to release a clear, colorless and rigid sheet.

EXAMPLE 1

To a 1 liter, three neck flask equipped with a mechanical stirrer, nitrogen line and vacuum line there was charged the following reactants:
60 grams of N-vinyl-2-pyrrolidone,
10 grams of the methyl chloride quaternary of dimethylaminoethyl methacrylate,
0.6 grams of tetraethylene glycol dimethacrylate
30 grams of 2-hydroxyethyl methacrylate
2.0 grams of MEK peroxide*, 11.5% active oxygen, and
5 grams of water

*LUPERSOL DSW, containing 11.5% active oxygen, obtained from Lucidol Division of Pennwalt Corporation The flask was thoroughly purged with nitrogen while stirring to effect solution and was then wasthen applied until gas bubbles no longer rose to the surface. The solution in the flask was then poured into a laboratory size glass casting cell consisting of two pieces of 8 inch × 12 inch plate glass, ¼ inch thick, clamped to 3/16 inch thick soft vinyl gasket. The sealed mold was laid on the shelf in a circulating air oven equipped with constant temperature control and maintained at 60° C. for 40 hours. Polymerization and cross-linking was then continued by gradually raising the temperature of the oven to 100° C. over a 3 hour period and holding at this temperature for one hour. The mold was removed from the oven and allowed to cool to room temperature, the clamps removed and the mold then pried open. The thus obtained clear, rigid, hard sheet was then immersed in water and allowed to swell until equilibrium had been reached. The thus obtained hydrogel was extremely soft pliable material, the water content of which, at equilibrium at 25° C., was 87% by weight.

EXAMPLE 2

The procedure of Example 1 was repeated using the following charge of reactants:
90.0 grams of N-vinyl pyrrolidone,
10 grams of dimethylaminoethyl methacrylate,
0.6 grams of tetraethylene glycol dimethacrylate and
0.8 grams of 2,2'-azobis-(2,4-dimethyl valeronitrile)

The very soft pliable hydrogel ultimately obtained had a water content of 78.3% by weight at equilibrium at 25° C.

EXAMPLE 3

The procedure of Example 1 was again repeated using the following charge of reactants:
50.0 grams of N-vinyl pyrrolidone,
50.0 grams of dimethylaminoethyl methacrylate,
0.6 grams of tetraethylene glycol dimethacrylate and
0.8 grams of 2,2'-azobis-(2,4-dimethyl valeronitrile).

The soft pliable hydrogel ultimately obtained had a water content of 42% by weight at equilibrium at 25° C.

Samples of the hydrogels of Examples 1, 2 and 3 readily react with acidic materials when placed in aqueous solutions or dispersion of the acidic material.

It will be understood that the foregoing examples are illustrative only of the present invention and are not to be interpreted as limiting the invention. A wide variety of cationic hydrogels can readily be produced employing other specific reactants of the type heretofore specified in proportions within the ranges specified. Additional specific recipes useful for the production of cationic hydrogels by the process of Example 1 or analogous procedures are given immediately below in tabular form.

TABLE 1

| | COMPONENT | PARTS BY WEIGHT | | | | | | | | | |
|---|---|---|---|---|---|---|---|---|---|---|---|
| | | Recipe 1 | 2 | 3 | 4 | 5 | 6 | 7 | 8 | 9 | 10 |
| (a) | N-Vinyl pyrrolidone | 20 | 40 | 85 | 50 | | | 60 | 40 | 95 | 70 |
| | N-vinyl piperidone | | | | | | 60 | | | | |
| | N-vinyl imidazole | | | | | 80 | | | | | |
| | Aminoethyl methacrylate | | | | | | | | | | 20 |

TABLE 1-continued

| | COMPONENT | Recipe 1 | 2 | 3 | 4 | 5 | 6 | 7 | 8 | 9 | 10 |
|---|---|---|---|---|---|---|---|---|---|---|---|
| | Aziridinylethyl methacrylate | 50 | | | | 20 | | | | | |
| | Dimethylaminoethyl methacrylate | | | | 10 | | | | | | |
| | tert. butyl aminoethyl methacrylate | | 40 | | | | 10 | | | | |
| (b) | 3-methacryloxy-2-hydroxypropyl trimethyl ammonium chloride | | | | | | | | 5 | | |
| | Dimethylaminoethyl methacrylate quaternized with methyl chloride | | | | 5 | | | | 10 | | |
| | Dimethylaminoethyl methacrylate quaternized with dimethyl sulfate | | | | | | | 10 | | | |
| | Polyethylene glycol 400 dimethacrylate | .8 | 4 | 10 | 3 | 1.2 | .8 | .4 | .2 | .2 | .8 |
| | Hydroxyethyl methacrylate | | | | 20 | | | 25 | 50 | | 10 |
| | Hydroxyethyl acrylate | 15 | 20 | | | | | | | | |
| | 2,3-Dihydroxypropyl methacrylate | 5 | | | | | | | | | |
| (d) | Methyl methacrylate | | | | | | 5 | | | | |
| | Methyl acrylate | | | | | | 5 | | | | |
| | Acrylamide | 10 | | | | | | 20 | 5 | | |
| | Methacrylamide | | | | | 20 | | | | | |
| | Water | | | | | | | 20 | | | |
| Catalyst | Azobis-isobutyronitrile | .8 | 1.2 | | | | | | | .4 | .6 |
| | 2,2'-azobis-(2,4-dimethylvaleronitile) | | | | | | .8 | 1 | | | |
| | Isopropyl percarbonate | | | .6 | | | | | | | |
| | MEK peroxide, 11.5% active oxygen | | | | 2 | 1.5 | | | 1 | | |
| | Acetyl salicyclic acid | | | | | | | | | | 30 |

The thus obtained cationic hydrogels of the present invention have a variety of applications in the arts. As previously stated they may readily be combined, by reaction or complexing, with materials having an anionic group or groups. The cationic hydrogels of the present invention in which the cationic groups are quaternary ammonium groups may also be combined, through complex formation, with other anionic compounds or hydrogels, especially those containing sulfate or sulfonate groups. Such combinations with anionic materials may be effected by immersing or washing the cationic hydrogels in an aqueous solution or suspension of an anionic material which it is desired to combine or complex therewith. Alternatively, if the anionic material to be combined or complexed with the cationic hydrogel is stable at the conditions used for polymerization and cross-linking, such stable anionic material may be added to the mixture of monomers prior to or during the simultaneous polymerization and cross-linking so that the cationic hydrogel is obtained directly in the form of its desired reaction product or complex with the anionic material. It is also feasible to form the salt or complex of component (b) — the ethylenically unsaturated monomer which contains a cationic group in its molecular structure — with such stable anionic material, and use such salt or complex as component (b) in the simultaneous polymerization and cross-linking.

Thus, the cationic hydrogels of the present invention may be used as anion exchangers in a manner analogous to known anion exchange resins. The cationic hydrogels of the present invention are particularly valuable for combination with anionic biologically active materials such as anioic agricultural chemicals, anionic drugs, and other pharmaceuticals, hormones, enzymes and anionic cosmetic materials; or in the case of quaternary hydrogels of this invention they may be combined, through complex formation, with anionic bactericides, deodorants, sodium heparinate, sodium lauryl sulfate etc. As previously stated, such biologically active materials are slowly released, under conditions of use, from such combinations with the cationic hydrogels.

As examples of anionic agricultural chemicals which may be combined with the cationic hydrogels of this invention and which are slowly released therefrom under conditions of use, when applied to plants, may be mentioned: (2,4-dichlorophenoxy) acetic acid; (2,4,5-trichlorophenoxy) acetic acid; 2-(2,4,5-trichlorophenoxy)-propionic acid; and 2,2-dichloropropionic acid.

As examples of anionic pharmaceutical products which may be combined with the cationic hydrogels of this invention may be mentioned: ascorbic acid (vitamin C); aspirin; barbiturates, e.g. 5-ethyl-5-phenylbarbituric acid (phenobarbital); 5-ethyl-5 (1-methylbutyl) barbituric acid (pentobarbital); and 5,5-diethylbarbituric acid (barbital); penicillins, e.g. penicillin G; penicillin K; penicillin X; penicillin F; and dihydro-penicillin F; also such salt forming (alkali soluble) pharmaceuticals as: sulfadiazine; sulfamethazine; and sulfamethylthiazole. As examples of bactericides (useful as topical antiseptics and in deodorants) which may be complexed with quaternary cationic hydrogels of this invention may be mentioned: Hexachlorophene, halogenated phenols, Trisbromosalicylanilide.

I claim:

1. The cationic, polymeric hydrogel produced by simultaneus polymerization and cross-linking in the presence of a free radical polymerization catalyst in an amount of from about 0.05 to about 4 weight percent, based on the total weight of monomers, and at a temperature of from about 20° C. to about 125° C., of a mixture consisting essentially of the following monomers:
   a. about 20 to about 95 weight percent, based on the total weight of monomers, of a heterocyclic N-vinyl monomer selected from the group consisting of N-vinyl lactams, N-vinyl succinimide, N-vinyl diglycoylimide, N-vinyl glutarimide, N-vinyl-3-morpholinone, N-vinyl-5-methyl-3-morpholinone and N-vinyl imidazole;
   b. about 50 to about 0.05 weight percent, based on the total weight of monomers, of a cationic monoethylenically unsaturated quaternary ammonium monomer, capable of copolymerizing with (a) and having the formula:

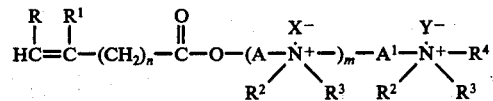

wherein:
R represents hydrogen, methyl or aryl;

$R^1$ represents hydrogen or alkyl of 1 to about 18 carbons;

A and $A^1$, each of which may be the same or different, each represents an alkylene group of from about 2 to about 8 carbons or an arylene group;

$R^2$, $R^3$ and $R^4$, each of which may be the same or different, each represents alkyl, aryl or alkaryl or the $R^2$ and $R^3$ on the same nitrogen atom, taken together represent a divalent aliphatic group of 4 to 5 atoms which jointly with the amino nitrogen forms a 5 or 6 membered heterocyclic amino group;

X and Y, each of which may be the same or different, each represents an anion forming the anionic portion of a quaternary ammonium group;

n represents an integer, including 0, of from 0 to about 10; and m represents an integer, including 0, of from 0 to about 5.

c. about 0.2 to about 12 weight percent, based on the total weight of monomers, of a polymerizable cross-linking agent capable of copolymerizing with (a) and (b); and having the formula:

wherein

R represents a member of the group consisting of hydrogen and alkyl of from 1 to about 4 carbon atoms;

A represents alkylene of from 2 to about 10 carbons or a polyglycol ether group of the formula:

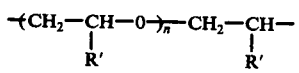

R' represents a member of the group consisting of hydrogen and alkyl of 1 to 2 carbon atoms; and n represents an integer of from 1 to about 20; and d. from 0 to about 50 weight percent, based on the total weight of monomers, of a monoethylenically unsaturated acrylic monomer capable of copolymerizing with (a), (b) and (c) and capable of polymerizing to a high molecular weight, in excess of 100,000 and selected from the group consisting of acrylamides, methacrylamides, acrylonitrile, methacrylonitrile, alkyl acrylates and methacrylates, hydroxyalkyl acrylates and methacrylates, and monohydroxy and monoalkoxy polyalkylene glycol acrylates and methacrylates; and provided that (a) $\geq$ (d) and (a)+(d) = about 40 to about 95 weight percent.

2. The cationic, polymeric hydrogel as defined in claim 1, wherein the cationic monomer specified as (b) is the methyl chloride quaternary of dimethylaminoethyl methacrylate.

3. The cationic, polymeric hydrogel as defined in claim 1, wherein the cationic monomer specified as (b) is the quaternary of 1-chloro-2-hydroxypropyl methacrylate reacted with trimethylamine and having the formula:

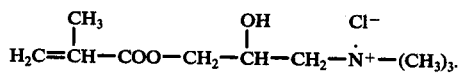

4. The cationic, polymeric hydrogel as defined in claim 1, wherein the N-vinyl monomer specified as (a) is an N-vinyl lactam.

5. The cationic, polymeric hydrogel as defined in claim 2, wherein, the N-vinyl monomer specified as (a) is an N-vinyl lactam.

6. The cationic, polymeric hydrogel as defined in claim 3, wherein the N-vinyl monomer specified as (a) is an N-vinyl lactam.

7. The cationic, polymeric hydrogel as defined in claim 1, wherein the N-vinyl monomer specified as (a) is N-vinyl-2-pyrrolidone.

8. The cationic, polymeric hydrogel as defined in claim 2, wheren the N-vinyl monomer specified as (a) is N-vinyl-2-pyrrolidone.

9. The cationic, polymeric hydrogel as defined in claim 3, wherein the N-vinyl monomer specified as (a) is n-vinyl-2-pyrrolidone.

10. The cationic, polymeric hydrogel as defined in claim 7, wherein the acrylic monomer specified as (d) is a hydroxyalkyl acrylate or methacrylate.

11. The cationic, polymeric hydrogel is defined in claim 7, wherein the acrylic monomer specified as (d) is 2-hydroxyethyl acrylate or methacrylate.

12. The cationic, polymeric hydrogel as defined in claim 8, wherein the acrylic monomer specified as (d) is a hydroxyalkyl acrylate or methacrylate.

13. The cationic, polymeric hydrogel as defined in claim 8, wherein the acrylic monomer specified as (d) is 2-hydroxyethyl acrylate or methacrylate.

14. The cationic, polymeric hydrogel as defined in claim 9, wherein the acrylic monomer specified as (d) is a hydroxyalkyl acrylate or methacrylate.

15. The cationic, polymeric hydrogel as defined in claim 9, wherein the acrylic monomer specified as (d) is 2-hydroxyethyl acrylate or methacrylate.

* * * * *

UNITED STATES PATENT AND TRADEMARK OFFICE
CERTIFICATE OF CORRECTION

PATENT NO. : 4,058,491
DATED : Nov. 15, 1977
INVENTOR(S) : Robert Steckler

It is certified that error appears in the above-identified patent and that said Letters Patent are hereby corrected as shown below:

Column 3, line 8, "anionic" should read -- cationic --.

Column 12, line 8, "was then wasthen" should read -- vacuum was then --.

Column 16, line 34 (claim 9, line 3), "n-vinyl" should read -- N-vinyl --.

Signed and Sealed this

Fifteenth Day of August 1978

[SEAL]

Attest:

RUTH C. MASON
Attesting Officer

DONALD W. BANNER
Commissioner of Patents and Trademarks